(12) United States Patent
Jeong et al.

(10) Patent No.: US 9,375,770 B2
(45) Date of Patent: Jun. 28, 2016

(54) ASYMMETRIC EXTRUSION METHOD AND APPARATUS

(75) Inventors: Hyo-Tae Jeong, Gangneung (KR); Byung-Hak Choe, Gangneung (KR)

(73) Assignee: GANGNEUNG-WONJU NATIONAL UNIVERSITY INDUSTRY ACADEMY COOPERATION GROUP, Gangneung (KR)

( * ) Notice: Subject to any disclaimer, the term of this patent is extended or adjusted under 35 U.S.C. 154(b) by 397 days.

(21) Appl. No.: 13/698,637

(22) PCT Filed: May 17, 2011

(86) PCT No.: PCT/KR2011/003617
§ 371 (c)(1),
(2), (4) Date: Nov. 16, 2012

(87) PCT Pub. No.: WO2011/145860
PCT Pub. Date: Nov. 24, 2011

(65) Prior Publication Data
US 2013/0055783 A1    Mar. 7, 2013

(30) Foreign Application Priority Data

May 18, 2010    (KR) .......................... 10-2010-0046224

(51) Int. Cl.
*B21C 23/00*    (2006.01)
*B21C 23/06*    (2006.01)
(Continued)

(52) U.S. Cl.
CPC ............... *B21C 23/001* (2013.01); *B21C 23/06* (2013.01); *B21C 25/02* (2013.01); *B29C 47/0019* (2013.01)

(58) Field of Classification Search
CPC ...... B21C 25/02; B21C 23/212; B21C 35/04; B21C 23/21; B21C 27/00; B21C 25/00; B21C 25/08; B21C 23/001; B21C 23/06; B29C 47/0021; B29C 47/0019; B29C 47/12; B29C 47/0057; B29C 47/54; B29C 47/86; B29C 47/00; B29C 47/0009; B29C 47/145; B29C 47/0047
USPC .................. 72/253.1, 260, 263, 272, 273, 467
See application file for complete search history.

(56) References Cited

U.S. PATENT DOCUMENTS 5,169,589 A * 12/1992 Francoeur ........... B29C 47/0004
264/177.1
5,826,456 A * 10/1998 Kawazoe ................ B21C 23/00
72/253.1

(Continued)

FOREIGN PATENT DOCUMENTS

CN    1436107 A    8/2003
JP    51-105962    9/1976
(Continued)

OTHER PUBLICATIONS

Machine Translation of JP2003096549A to Azuma et al.*
(Continued)

*Primary Examiner* — Peter DungBa Vo
*Assistant Examiner* — John S Lowe

(57) ABSTRACT

An asymmetric extrusion method, an extruded material extruded using the same, a die for asymmetric extrusion, and an asymmetric extrusion apparatus. According to the asymmetric extrusion method, an extruded material having a plate shape is formed by pushing an extruding material through a die including an extrusion hole having an asymmetric shape with respect to an extrusion direction of the extruding material, so as to extrude the extruding material while inducing shear strain in the extruding material.

10 Claims, 9 Drawing Sheets

(51) Int. Cl.
*B21C 25/02* (2006.01)
*B29C 47/00* (2006.01)

(56) References Cited

U.S. PATENT DOCUMENTS

| | | | |
|---|---|---|---|
| 6,190,595 | B1 | 2/2001 | Thoms et al. |
| 2004/0074275 | A1* | 4/2004 | Jin ................................. 72/260 |

FOREIGN PATENT DOCUMENTS

| | | | |
|---|---|---|---|
| JP | 58-184012 | A | 10/1983 |
| JP | 2002-248517 | A | 9/2002 |
| JP | 2003-096549 | A | 4/2003 |
| JP | 2003096549 | A * | 4/2003 |
| JP | 2003096549 | A * | 4/2003 |
| JP | 2004-513787 | A | 5/2004 |
| KR | 1020000054603 | A | 9/2000 |

OTHER PUBLICATIONS

Notice of Allowance for Korean Application No. 10-2010-0046224 dated Jun. 22, 2011.

International Search Report for PCT/KR2011/003617 filed on May 17, 2011.

* cited by examiner

ASYMMETRIC EXTRUSION METHOD AND APPARATUS

TECHNICAL FIELD

The present invention relates to a method of forming a material, and more particularly, to an extrusion apparatus and extrusion method capable of controlling texture of a material.

BACKGROUND ART

An extrusion method is generally used to process a plate material. During an extrusion process, a material may be deformed and texture of the material may be changed. It is known that texture of a material greatly influences mechanical characteristics, for example, formability of the material. Conventionally, a metallic material has its unique slip system according to its crystal structure, and formability of the metal material may vary according to whether the slip system operates. Whether the slip system operates is closely related to texture of the metal material.

DETAILED DESCRIPTION OF THE INVENTION

Technical Problem

However, when a plate material is processed, a typical symmetric extrusion method may not improve formability of a material by controlling its texture.

The present invention provides an extrusion method capable of controlling texture of a material, and a plate material of which texture is controlled using the method. The present invention also provides a die capable of controlling texture of a material, and an extrusion apparatus including the die. The above problems are exemplarily provided and the range of the present invention is not limited thereto.

According to an aspect of the present invention, there is provided an asymmetric extrusion method for extruding an extruding material to a plate shape, the method including pushing the extruding material through a die including an extrusion hole having an as asymmetric shape with respect to an extrusion direction of the extruding material, so as to extrude the extruding material while inducing shear strain in the extruding material.

Technical Solution

The extrusion hole of the die may include a tapered part having a width varied according to the extrusion direction of the extruding material, and the tapered part may have an asymmetric shape with respect to the extrusion direction of the extruding material. Furthermore, the tapered part may have an asymmetric shape with respect to a plate surface direction of the plate shape.

The die may include a pair of first inner surfaces spaced apart from each other at the tapered part along a thickness direction of the plate shape, and the pair of first inner surfaces may have different gradients along the extrusion direction.

The extrusion hole may have a rectangular cross-section, the die may include a pair of second inner surfaces spaced apart from each other at the tapered part along a width direction of the plate shape, and the pair of second inner surfaces may be symmetric along the extrusion direction.

According to another aspect of the present invention, there is provided an asymmetric extrusion method including charging an extruding material into a container; compressing the extruding material in the container using a stem; and pushing the extruding material through a die combined with an end portion of the container and including an extrusion hole having an asymmetric shape, so as to extrude the extruding material to a plate shape, wherein the extrusion hole of the die includes a tapered part having a width varied according to an extrusion direction of the extruding material, and wherein the tapered part has an asymmetric shape with respect to the extrusion direction of the extruding material.

According to another aspect of the present invention, there is provided an extruded material having a plate shape and formed by extruding an extruding material using one of the above asymmetric extrusion methods.

The extruded material may have a texture different from that of the extruding material.

According to another aspect of the present invention, there is provided a die for asymmetric extrusion, the die including an extrusion hole having an asymmetric shape and for extruding an extruding material to a plate shape, wherein the extrusion hole includes a tapered part having a width varied according to an extrusion direction of the extruding material, and wherein the tapered part has an asymmetric shape with respect to the extrusion direction of the extruding material.

According to another aspect of the present invention, there is provided an asymmetric extrusion apparatus including the above die.

According to another aspect of the present invention, there is provided an asymmetric extrusion apparatus including a container for charging an extruding material; a die combined with an end portion of the container and including an extrusion hole having a rectangular shape and for extruding the extruding material to a plate shape; and a stem disposed in the container opposite to the die so as to push the extruding material, wherein the extrusion hole includes a tapered part having a width varied according to an extrusion direction of the extruding material, and wherein the tapered part has an asymmetric shape with respect to the extrusion direction.

Advantageous Effects

If an extrusion method and extrusion apparatus according to embodiments of the present invention are used, formability of an extruded material may be greatly improved by controlling texture of an extruding material. An extruded material having a plate shape and formed according to embodiments of the present invention has a slip system oriented to appropriately induce shear strain at room temperature may have an excellent formability at room temperature.

BEST MODE

Figure 1:
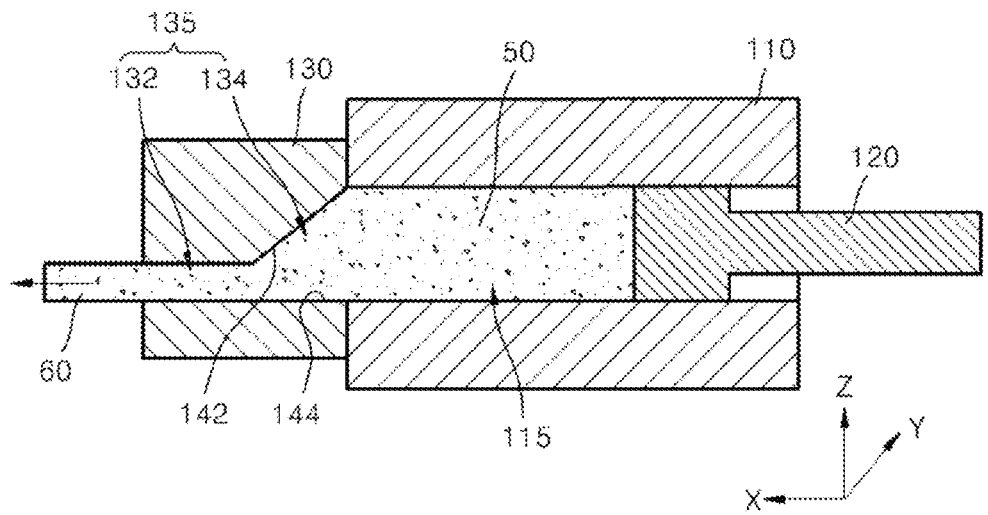
FIG. 1 is a cross-sectional view of an extrusion apparatus according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the sizes of components may be exaggerated or reduced for convenience of explanation.

In embodiments of the present invention, texture may represent a state in which crystalline grains of a polycrystalline material are oriented in a certain direction. Also, texture of a material is used as a relative concept rather than an absolute concept. That is, if a material has texture in a certain direction, it means that most, not all, of crystalline grains of the material have texture in the mentioned direction.

Furthermore, a pole figure is a figure showing a distribution direction of crystallographic lattice planes in the form of stereographic projection so as to analyze a crystal orientation or texture of a material. The pole figure may be illustrated by using X-ray diffraction (XRD) analysis.

In addition, an extruding material refers to a target material to be extruded, and an extruded material is a resultant material obtained when the extruding material is completely extruded to a desired shape.

Figure 2:
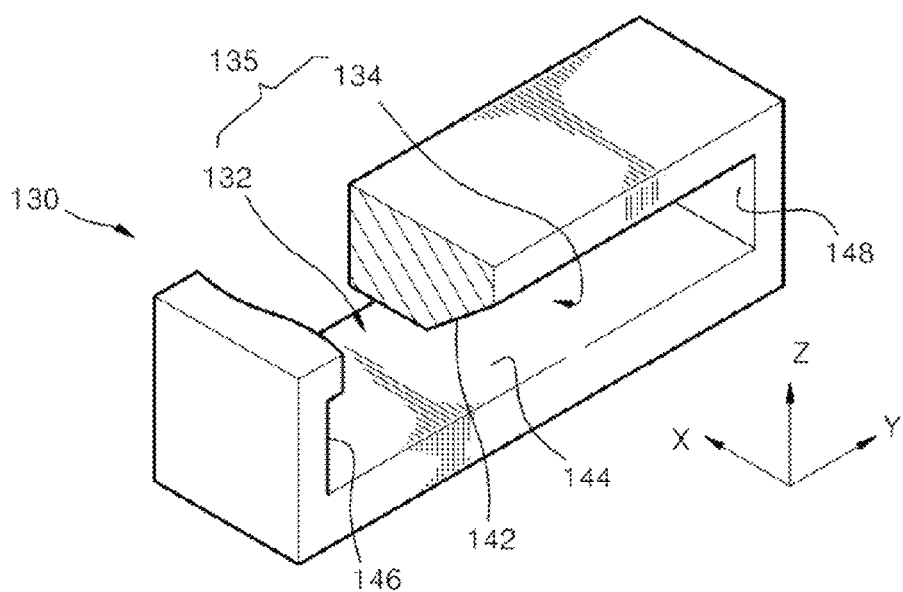
FIG. 2 is a partially-cut perspective view of a die of the extrusion apparatus illustrated in FIG. 1.
Figure 3:
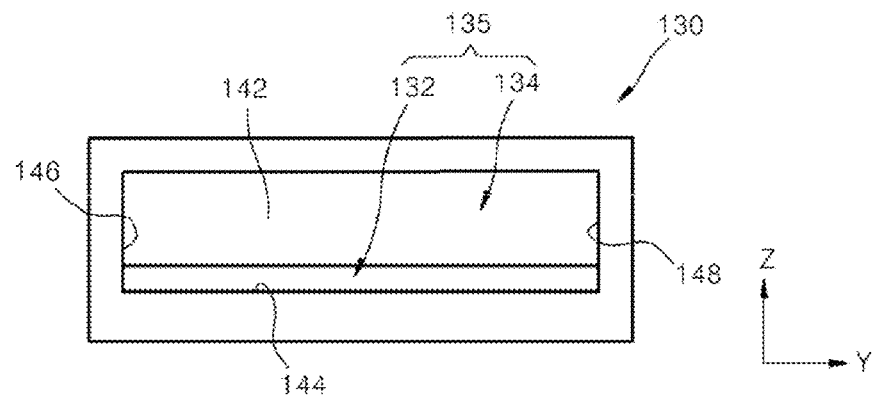
FIG. 3 is a plan view of the die illustrated in FIG. 2.

FIG. 1 is a cross-sectional view of an extrusion apparatus according to an embodiment of the present invention. FIG. 2 is a partially-cut perspective view of a die 130 of the extrusion apparatus illustrated in FIG. 1. FIG. 3 is a plan view of the die 130 illustrated in FIG. 2.

Referring to FIG. 1, a container 110 for charging an extruding material 50 may be provided. For example, the extruding material 50 may be charged into an inner hole 115 of the container 110 in the form of a billet. As another example, the extruding material 50 may be charged into the inner hole 115 of the container 110 in the form of powder or a compact. The container 110 and the inner hole 115 may have various shapes to accommodate the extruding material 50. Accordingly, the shapes of the extruding material 50 and the container 110 may be variously changed, and do not limit the range of the current embodiment.

A stem 120 may be disposed in the container 110 to push and compress the extruding material 50 into the container 110. For example, in order to effectively compress the extruding material 50, the shape of the stem 120 may correspond to the shape of the inner hole 115 of the container 110. As another example, the shape of the stem 120 may not correspond to the shape of the inner hole 115 and, in this case, a part of the extruding material 50 may not be compressed and may remain in the container 110. The stem 120 may also be referred to as a ram or a compressor, and its name and shape do not limit the range of the current embodiment.

The die 130 may be combined with an end portion of the container 110 opposite to the stem 120. For example, the stem 120, the container 110, and the die 130 may be aligned and combined in a row, for example, in the X axis direction of FIG. 1. The X axis direction may be an extrusion direction of the extruding material 50. In a modified embodiment of the current embodiment, the stem 120, the container 110, and the die 130 may not be aligned in a row and, in this case, the extrusion direction may be mostly determined with respect to the die 130.

The die 130 may have an extrusion hole 135 for defining an extrusion shape of the extruding material 50. The extruding material 50 may be changed into an extruded material 60 having a plate shape after being passed through the extrusion hole 135 of the die 130. For example, in FIG. 1, the XY plane may be a plate surface direction of the extruded material 60, the Z axis direction may be a thickness direction of the extruded material 60, the X axis direction may be a length direction of the extruded material 60, and the Y axis direction may be a width direction of the extruded material 60.

The extrusion hole 135 may include a tapered part 134 having a variable width, and a fixed part 132 having a fixed width. The extruding material 50 compressed by the stem 120 may have its width and shape substantially varied while passing through the tapered part 134 and then may be extruded to obtain the shape of the extruded material 60 while passing through the fixed part 132. As described below, the tapered part 134 of the extrusion hole 135 may have an asymmetric shape with respect to the extrusion direction (X axis direction) to control texture of the extruded material 60.

Referring to FIGS. 1 through 3, in order to extrude the extruding material 50 to a plate shape, the extrusion hole 135 may have a rectangular cross-section with respect to the YZ plane. The die 130 may include a pair of first inner surfaces 142 and 144 and a pair of second inner surfaces 146 and 148 for defining the extrusion hole 135. The first inner surfaces 142 and 144 may be spaced apart from each other along the thickness direction (Z axis direction) of the extruding material 50 or the extruded material 60, and the second inner surfaces 146 and 148 may be spaced apart from each other along the width direction (Y axis direction) of the extruding material 50 or the extruded material 60.

The first inner surfaces 142 and 144 may define plate surfaces of the extruded material 60. The first inner surfaces 142 and 144 may be asymmetric with respect to the plate surface direction (XY plane) of the extruded material 60 in order to effectively induce shear strain in the extruded material 60. For example, the first inner surfaces 142 and 144 may extend with different gradients. For example, the first inner surface 142 may have a certain gradient with respect to the extrusion direction (X axis direction), and the first inner surface 144 may be parallel to the extrusion direction (X axis direction).

Therefore, a deformation angle of the extruding material 50 may be varied and thus a large shear strain may occur between the first inner surfaces 142 and 144. In the current embodiment, since the first inner surface 144 is parallel to the extrusion direction, the shear strain may be slightly linear between the first inner surfaces 142 and 144 and thus may be easily controlled. The shear strain may greatly influence a change in texture of the extruded material 60 along the plate surface direction. As described below, the change in texture may greatly influence formability of the extruded material 60.

The second inner surfaces 146 and 148 may define side surfaces of the extruded material 60. If the extruded material 60 has a plate shape, the second inner surfaces 146 and 148 may not greatly influence the texture of the extruded material 60. As such, the second inner surfaces 146 and 148 may be symmetric and, for example, may be parallel to the thickness direction (Z axis direction) of the extruded material 60. In a modified embodiment of the current embodiment, the second inner surfaces 146 and 148 may be asymmetric.

An asymmetric extrusion method according to an embodiment of the present invention will now be described. The asymmetric extrusion method according to the current embodiment may be explained using, for example, the extrusion apparatus illustrated in FIGS. 1 through 3.

Referring to FIGS. 1 through 3, the extruding material 50 may be charged into the container 110. Then, the extruding material 50 in the container 110 may be compressed using the stem 120. Then, the extruding material 50 may be pushed through the die 130 to form the extruded material 60 having a plate shape. As described above, since the die 130 has the extrusion hole 135 that is asymmetric with respect to the extrusion direction, the extruding material 50 may be extruded while inducing shear strain in the extruding material 50. The asymmetric extrusion method may be understood better with reference to the above descriptions of the extrusion apparatus illustrated in FIGS. 1 through 3.

By inducing shear strain in the extruding material 50 as described above, the texture of the extruded material 60 may be controlled. As such, the texture of the extruded material 60 may differ from the texture of the extruding material 50. Accordingly, if the extruding material 50 has a poor formability in a typical extrusion condition, the texture may be changed while it is extruded and thus the formability of the extruded material 60 may be improved.

In an asymmetric extrusion method according to another embodiment of the present invention, the charging and the compressing of the extruding material 50 may be variously modified or may be skipped. For example, the extruding material 50 may be directly charged into and may be compressed in the die 130. As another example, the charging, the compressing, and the extruding of the extruding material 50 may not be individually referred and may be integrally referred to as a series of extrusion processes.

Although the asymmetric extrusion methods according to the above embodiments are described with reference to the extrusion apparatus illustrated in FIGS. 1 through 3, their ranges are not limited to the extrusion apparatus.

The extruded material 60 formed using the above asymmetric extrusion methods may be repeatedly asymmetrically extruded or may be rolled in order to further reduce its thickness.

Figure 4:
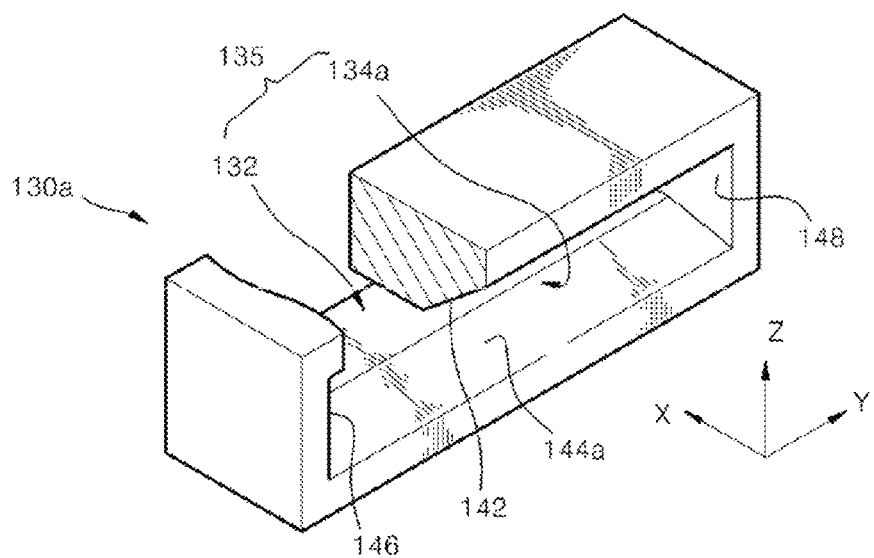
FIG. 4 is a partially-cut perspective view of a die according to another embodiment of the present invention.
Figure 5:
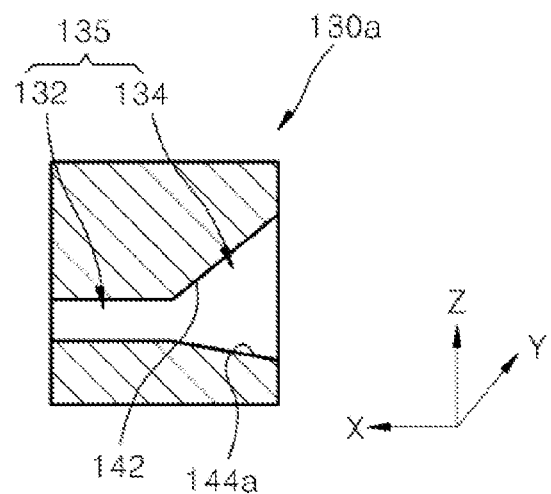
FIG. 5 is a cross-sectional view of the die illustrated in FIG. 4.

FIG. 4 is a partially-cut perspective view of a die 130a according to another embodiment of the present invention. FIG. 5 is a cross-sectional view of the die 130a illustrated in FIG. 4. The die 130a according to the current embodiment is partially modified from the die 130 illustrated in FIGS. 1 through 3, and thus repeated descriptions therebetween are not provided here.

Referring to FIGS. 4 and 5, an extrusion hole 135a has a shape modified from the extrusion hole 135 illustrated in FIGS. 1 through 3. The extrusion hole 135a may also have an asymmetric shape with respect to the extrusion direction (X axis direction). In the current embodiment, first inner surfaces 142 and 144a for defining a tapered part 134a may have different gradients with respect to the extrusion direction (X axis direction). The first inner surface 144a may not be parallel to the extrusion direction and may extend with a gradient different from that of the first inner surface 142. The gradients of the first inner surfaces 142 and 144a are exemplarily illustrated, and may be variously changed as long as the first inner surfaces 142 and 144a have different gradients.

Therefore, the tapered part 134a of the extrusion hole 135a may also have an asymmetric shape with respect to the extrusion direction. In particular, the tapered part 134a of the extrusion hole 135a may also have an asymmetric shape with respect to the plate surface direction (XY plane) of the extruded material 60 (see FIG. 1).

As such, a deformation angle of the extruding material 50 (see FIG. 1) may be varied and thus a shear strain may also occur between the first inner surfaces 142 and 144a. However, since both the first inner surfaces 142 and 144a are inclined with respect to the extrusion direction, the shear strain may be slightly complicated. The shear strain may influence a change in texture of the extruded material 60 (see FIG. 1).

An extrusion method using the die 130a illustrated in FIGS. 4 and 5 may be understood based on the above descriptions, and may be understood better with reference to the descriptions of the extrusion method using the die 130 illustrated in FIGS. 2 and 3.

The extruding material 50 (see FIG. 1) used in the above asymmetric extrusion apparatus and the asymmetric extrusion method may include various materials. For example, the extruding material 50 may include various metals having texture or alloys thereof. The metals or the alloys thereof may have various crystal structures, for example, a hexagonal closed-packed (HCP) structure, a face centered cubic (FCC) structure, or a body centered cubic (BCC) structure. In more detail, the extruding material 50 may include a metal such as magnesium (Mg), titanium (Ti), zirconium (Zr), zinc (Zn), aluminum (Al), copper (Cu), or iron (Fe), or an alloy thereof. The Fe alloy may include cast iron, carbon steel, high speed steel, or electrical steel (a Fe—Si alloy). The above-described metal element or metal structure of the extruding material 50 is exemplarily provided, and the range of the current embodiment is not limited thereto.

Hereinafter, for convenience of explanation, the extruding material 50 (see FIG. 1) is assumed as a metal or a metal alloy having an HCP structure, and characteristics of a plate material extruded using an asymmetric extrusion apparatus and extrusion method is described in detail. For example, the metal having an HCP structure may include Mg, Zn, Zr, or Ti.

Figure 12:
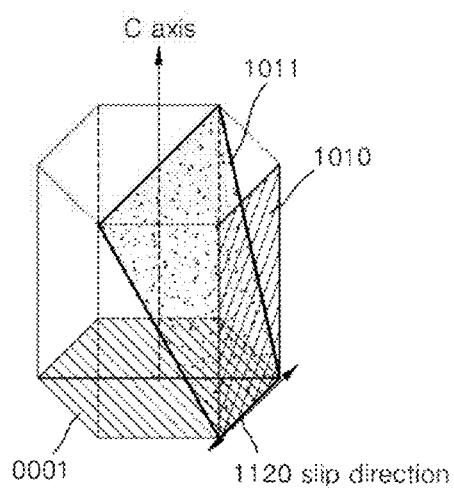
FIG. 12 is a schematic diagram showing a slip system having a hexagonal closed packed (HCP) structure.
Figure 13:
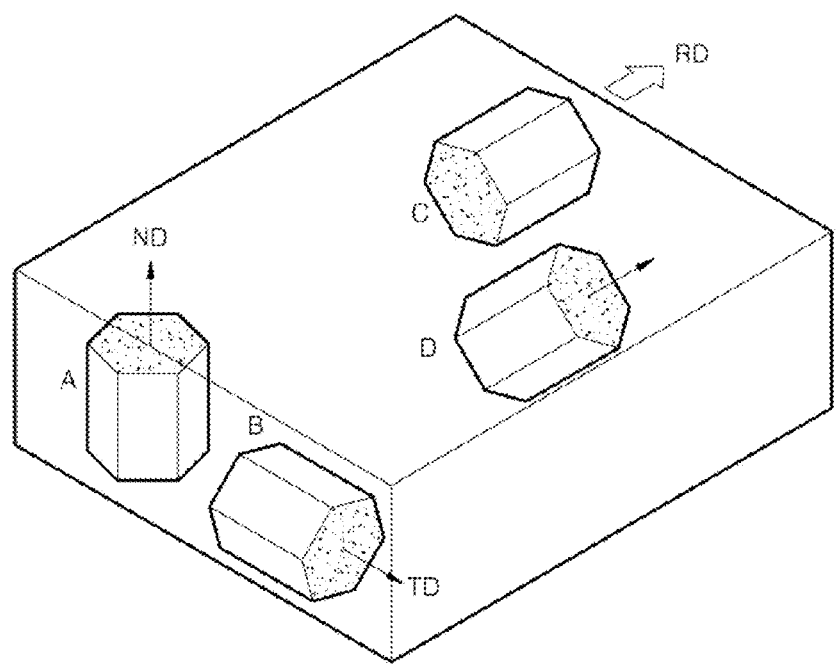
FIG. 13 is a schematic diagram showing slip systems according to crystal orientations of HCP structures.
Figure 14:
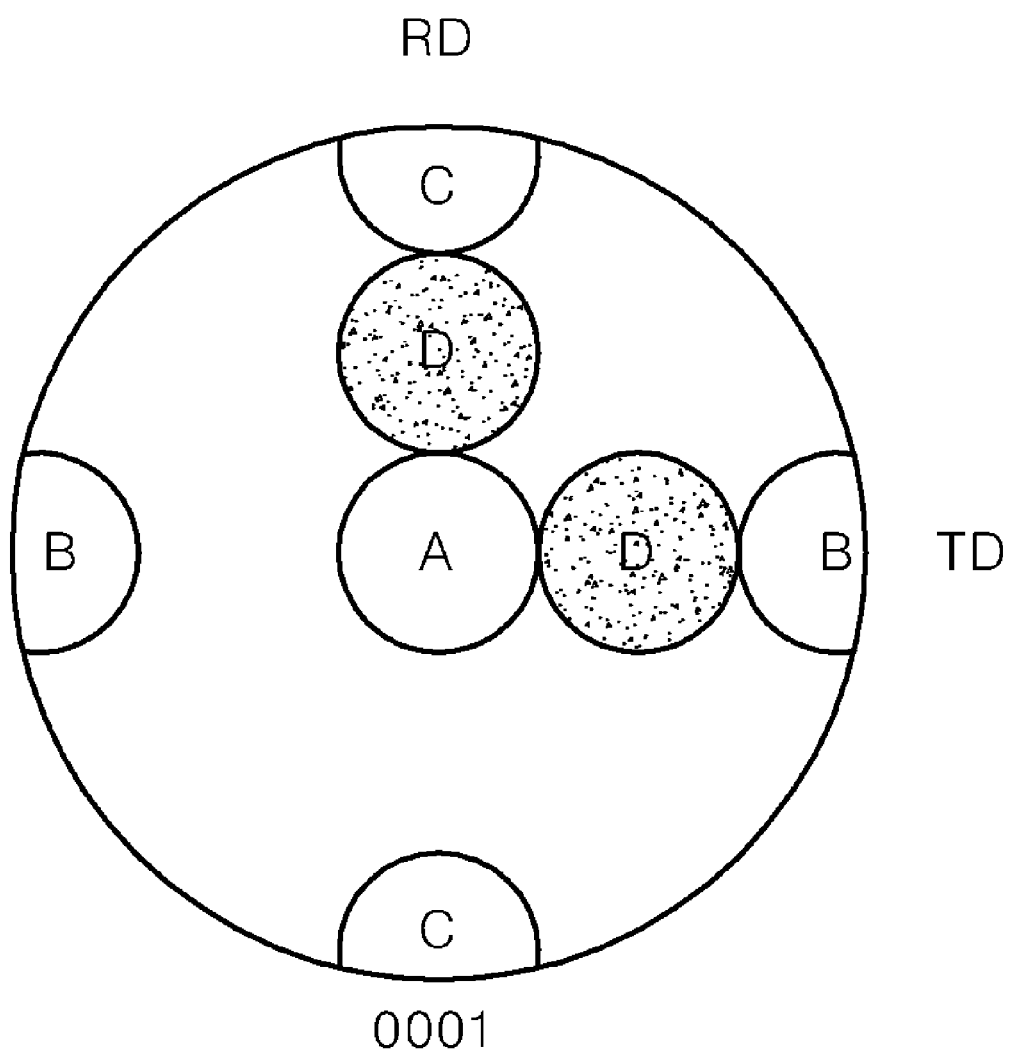
FIG. 14 is a schematic diagram showing poles of first through fourth samples illustrated in FIG. 13, on the (0001) pole figure of the HCP structures.

FIG. 12 is a schematic diagram showing a slip system having an HCP structure. FIG. 13 is a schematic diagram showing slip systems according to crystal orientations of HCP structures. FIG. 14 is a schematic diagram showing poles of first through fourth samples A through D illustrated in FIG. 13, on the (0001) pole figure of the HCP structures.

Referring to FIG. 12, when a metal having an HCP structure is processed, it is known that a restrictive slip system such as a basal plane slip system of {0001}<1120>, a prismatic slip system of {1010}<1120>, or a pyramidal slip system of {1011}<1120>, and a twin system are used. The metal having an HCP structure has a poor formability at room temperature due to the restrictive slip system.

In the metal having an HCP structure, critical resolved shear stress values of deformation mechanisms other than the basal plane slip system at room temperature are much greater than that of the basal plane slip system. Accordingly, the disposition of a slip system such as the basal plane slip system greatly influences formability of HCP structure at room temperature.

Referring to FIGS. 13 and 14, if the basal plane slip system is parallel to plate surfaces of the extruded material, i.e., perpendicular to a normal direction ND, as represented by the first sample A, if the basal plane slip system is perpendicular to a plate surface direction RD or a transverse direction TD as represented by the second and third samples B and C, formability at room temperature is poor. This is because, when the extruded material is formed, a main deformation direction (e.g., ND, RD, or TD) is perpendicular or parallel to the basal plane slip system and thus an external stress makes operation of the basal plane slip system difficult.

However, if the basal plane slip system is tilted by a certain angle with respect to a main deformation direction on a slip surface in a slip direction as represented by the fourth sample D, a material may be easily deformed and thus an excellent formability at room temperature is achieved.

The orientation and distribution of the basal plane slip system in a material may be checked as illustrated in the (0001) pole figure of an HCP structure. Hereinafter, AZ31 having an HCP structure is described in detail as a plate material. AZ31 is an example of an Mg alloy including Mg, Al, and Zn.

Figure 6:
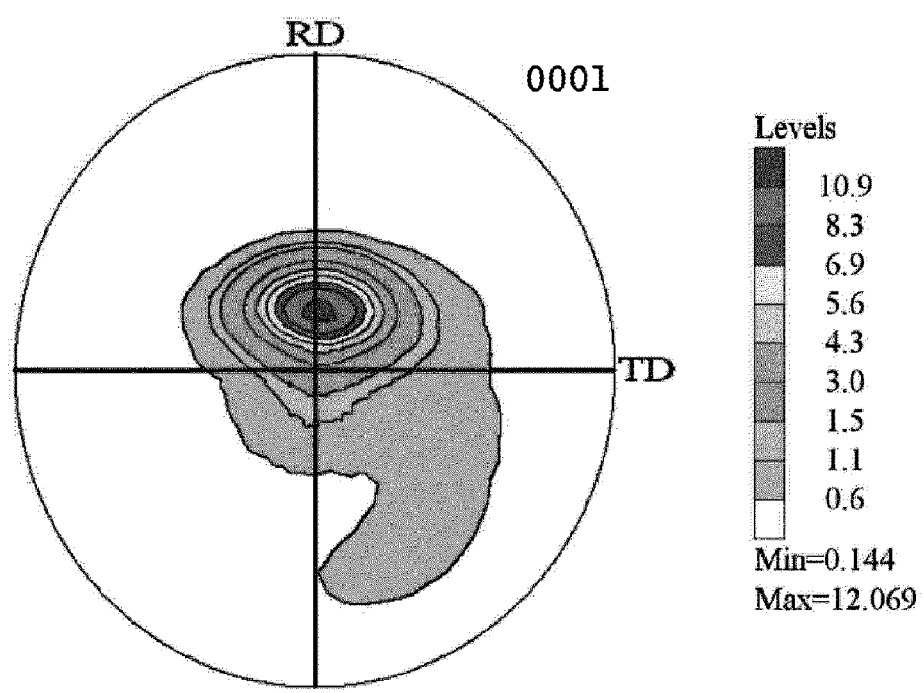
FIG. 6 is the (0001) pole figure of AZ31 extruded using an asymmetric extrusion method according to an embodiment of the present invention, in a +Z axis direction.
Figure 7:
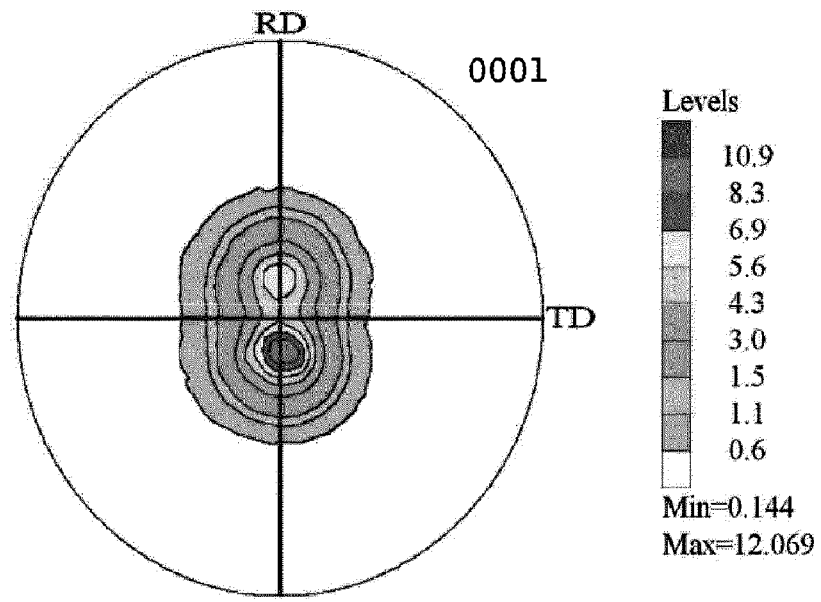
FIG. 7 is the (0001) pole figure of AZ31 extruded using an asymmetric extrusion method according to an embodiment of the present invention, in a −Z axis direction.
Figure 8:
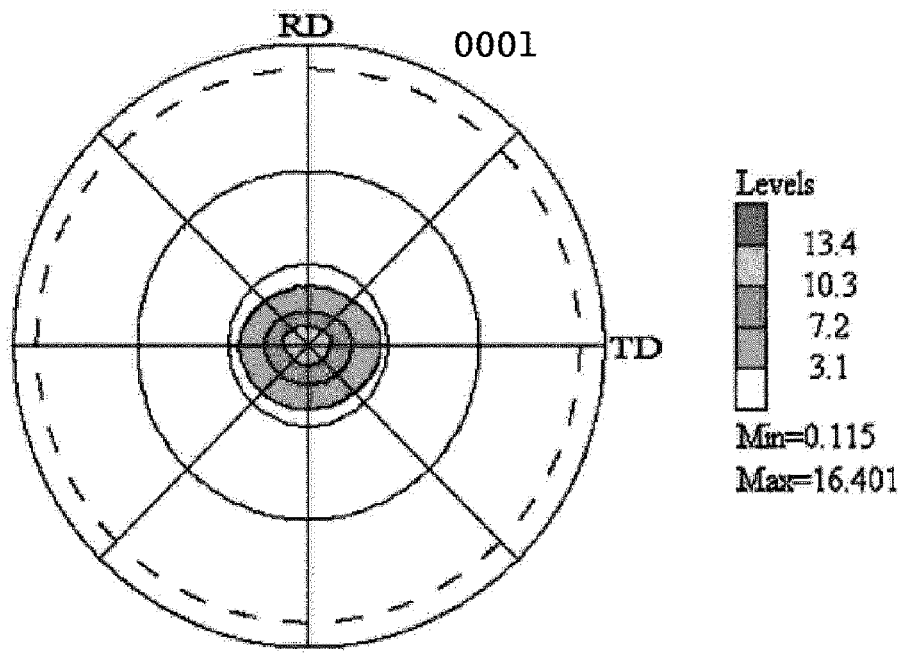
FIG. 8 is the (0001) pole figure of AZ31 according to a comparative example.

FIG. 6 is the (0001) pole figure of AZ31 extruded using an asymmetric extrusion method according to an embodiment of the present invention, in a +Z axis direction. FIG. 7 is the (0001) pole figure of AZ31 extruded using an asymmetric extrusion method according to an embodiment of the present invention, in a −Z axis direction. FIG. 8 is the (0001) pole figure of AZ31 according to a comparative example.

Referring to FIGS. 6 and 7, in AZ31 asymmetrically extruded according to an embodiment of the present invention, a crystal orientation on a basal plane of the (0001) pole figure, i.e., the (0001) plane, is clearly out of center. Orientation of asymmetrically extruded AZ31 on the (0001) pole figure is similar to that of the fourth sample D illustrated in FIGS. 13 and 14. Accordingly, asymmetrically extruded AZ31 is oriented to allow its basal plane slip system to form a certain degree with respect to a main deformation direction and thus has an excellent formability.

However, as illustrated in FIG. 8, in symmetrically rolled or symmetrically extruded AZ31 according to the comparative example, a crystal orientation of a basal plane on the (0001) pole figure is centered. The above orientation is similar to that of the first sample A illustrated in FIGS. 13 and 14, and thus AZ31 according to the comparative example may not have an excellent formability.

Figure 9:
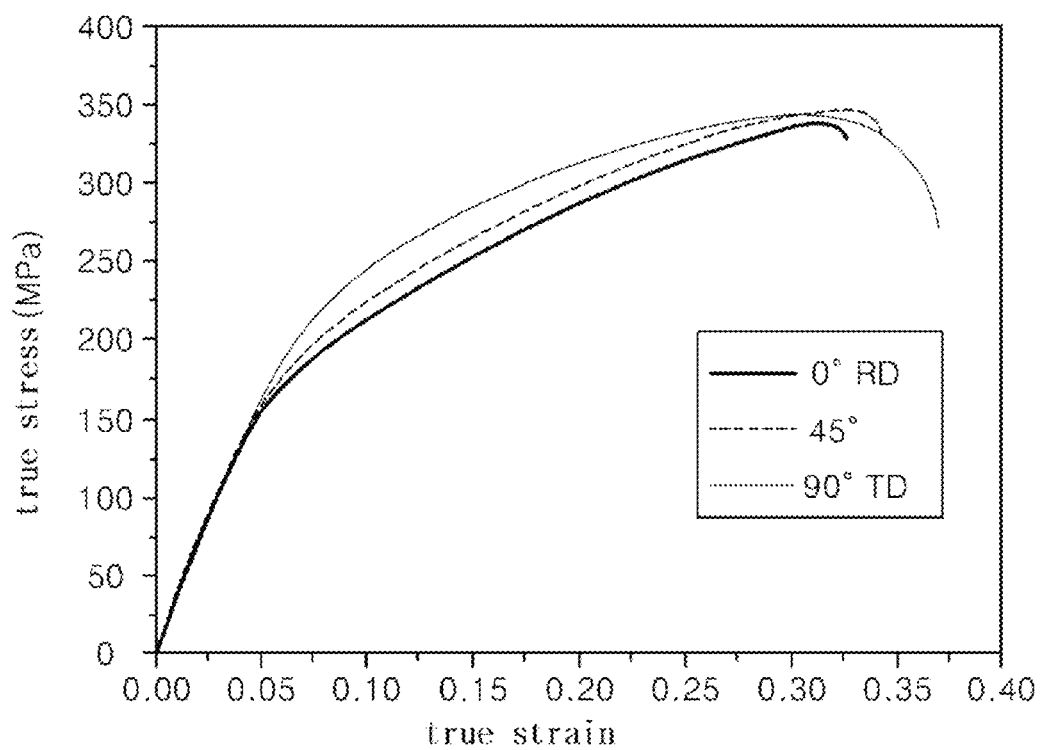
FIG. 9 is a graph showing true stress versus true strain of AZ31 extruded using an asymmetric extrusion method according to an embodiment of the present invention.
Figure 10:
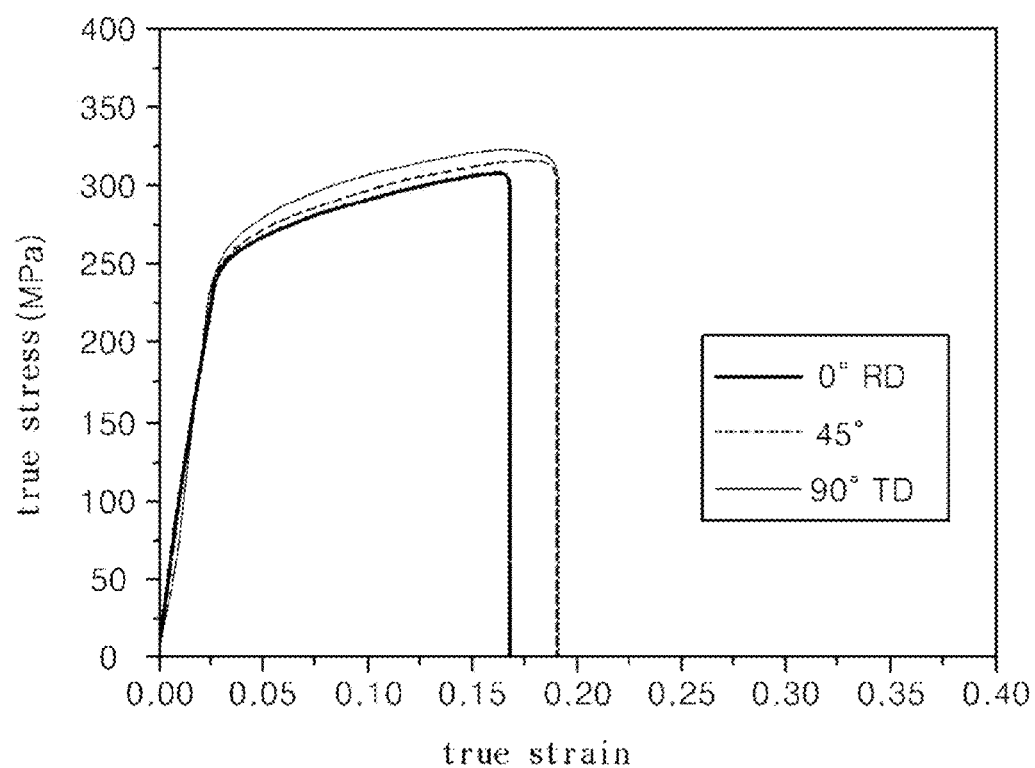
FIG. 10 is a graph showing true stress versus true strain of AZ31 according to a comparative example.

FIG. 9 is a graph showing true stress versus true strain of AZ31 extruded using an asymmetric extrusion method according to an embodiment of the present invention. FIG. 10 is a graph showing true stress versus true strain of AZ31 according to a comparative example.

Referring to FIG. 9, AZ31 asymmetrically extruded according to an embodiment of the present invention has a high elongation equal to or greater than 35%. However, as illustrated in FIG. 10, AZ31 according to the comparative example has a low elongation of 15 to 20%. Accordingly, an elongation of AZ31 may be greatly improved using the asymmetric extrusion method. The improvement in elongation may cause an improvement in formability of AZ31.

Figure 11:
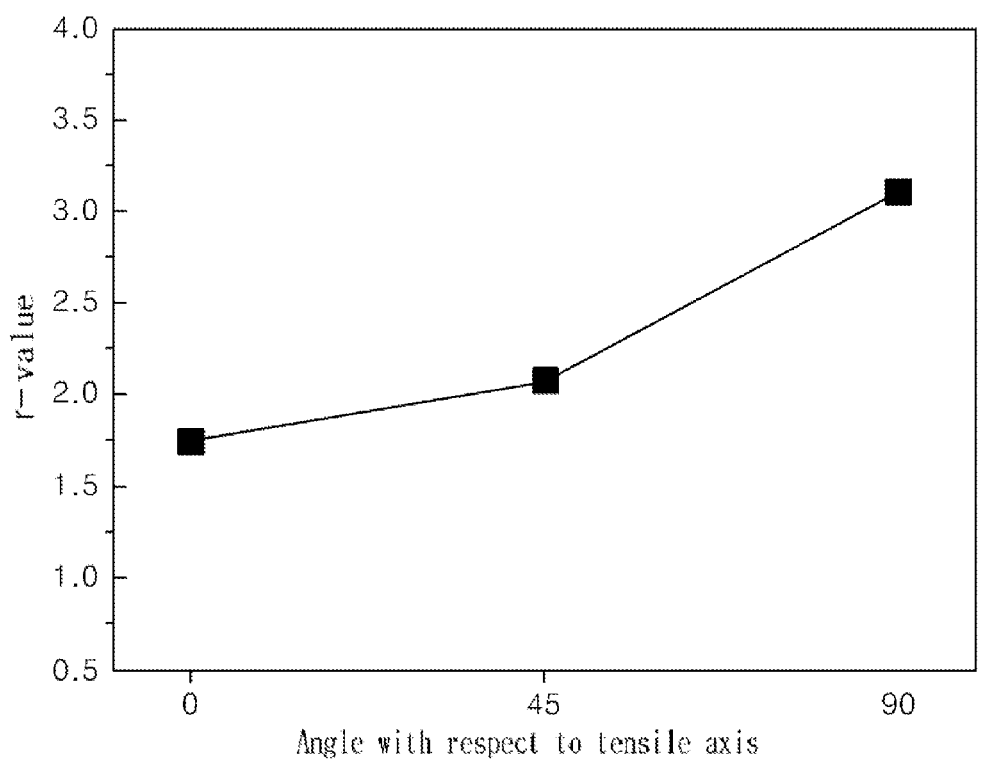
FIG. 11 is a graph showing an r-value versus an angle of AZ31 extruded using an asymmetric extrusion method according to an embodiment of the present invention, with respect to a tensile axis.

FIG. 11 is a graph showing an r-value versus an angle of AZ31 extruded using an asymmetric extrusion method according to an embodiment of the present invention, with respect to a tensile axis.

Referring to FIG. 11, asymmetrically extruded AZ31 does not have a large anisotropy according to a tensile angle and has a high r-value of a steel level.

As described above, AZ31 asymmetrically extruded according to embodiments of the present invention has a texture greatly different from that of AZ31 according to a comparative example, and thus has a high elongation and an excellent formability.

The above descriptions of a metal or a metal alloy having an HCP structure may also be applied to a metal or a metal alloy having another structure such as a BCC structure or an FCC structure.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. An asymmetric extrusion method, the method comprising:
   forming a sheet by pushing an extruding material through a die while inducing shear strain in the extruding material, the die comprising an extrusion hole including a fixed part and a tapered part, the tapered part having an asymmetric shape with respect to an extrusion direction of the extruding material,
   wherein the extruding material is a metal or metal alloy, and
   wherein the fixed part and the tapered part have a common lower surface,
   wherein the sheet is formed by pushing the extruding material through an inner hole, the inner hole being connected to a first end of the tapered part, a surface of the inner hole being coplanar with the common lower surface, and
   wherein a second end of the tapered part is connected to the fixed part.

2. The asymmetric extrusion method of claim 1, wherein a thickness of the tapered part varies according to the extrusion direction of the extruding material.

3. The asymmetric extrusion method of claim 2, wherein the tapered part has an asymmetric shape with respect to a surface direction of the sheet.

4. The asymmetric extrusion method of claim 2, wherein the die comprises a pair of first inner surfaces spaced apart from each other at the tapered part along a thickness direction of the sheet, one of the first inner surfaces being the common lower surface, and
   wherein a distance between the pair of first inner surfaces varies along the extrusion direction.

5. The asymmetric extrusion method of claim 4, wherein the common lower surface is parallel to the extrusion direction.

6. The asymmetric extrusion method of claim 4, wherein the extrusion hole has a rectangular cross-section,
   wherein the tapered part comprises a pair of second inner surfaces spaced apart from each other along a width direction of the sheet, and
   wherein the pair of second inner surfaces are symmetric along the extrusion direction.

7. The asymmetric extrusion method of claim 6, wherein the pair of second inner surfaces are parallel to the extrusion direction.

8. The asymmetric extrusion method of claim 1, wherein the shear strain tilts a basal plane slip system of the extruding material with respect to a surface of the sheet.

9. The asymmetric extrusion method of claim 1, wherein the extruding material is pushed at room temperature.

10. The asymmetric extrusion method of claim 1, wherein the inner hole is directly connected to the tapered part, and the tapered part is directly connected to the fixed part.

* * * * *